(12) United States Patent
Deforet et al.

(10) Patent No.: US 10,858,114 B2
(45) Date of Patent: Dec. 8, 2020

(54) ASSEMBLY FOR AN AIRCRAFT, THE ASSEMBLY COMPRISING A PYLON AND A FRONT ENGINE MOUNT

(71) Applicant: Airbus Operations SAS, Toulouse (FR)

(72) Inventors: Thomas Deforet, Toulouse (FR); Jacky Puech, Colomiers (FR)

(73) Assignee: AIRBUS ORPERATIONS SAS, Toulouse (FR)

( * ) Notice: Subject to any disclaimer, the term of this patent is extended or adjusted under 35 U.S.C. 154(b) by 0 days.

(21) Appl. No.: 16/431,280

(22) Filed: Jun. 4, 2019

(65) Prior Publication Data

US 2020/0031482 A1     Jan. 30, 2020

(30) Foreign Application Priority Data

Jul. 30, 2018    (FR) ..................................... 18 57073

(51) Int. Cl.
    *F16M 11/00*      (2006.01)
    *B64D 27/26*      (2006.01)

(52) U.S. Cl.
    CPC ........ B64D 27/26 (2013.01); *B64D 2027/266* (2013.01)

(58) Field of Classification Search
    CPC .......... F02C 7/20; B64D 27/26; B64D 27/266
    See application file for complete search history.

(56) References Cited

U.S. PATENT DOCUMENTS

| | | | |
|---|---|---|---|
| 2008/0223983 A1* | 9/2008 | Lafont | ................... B64D 27/26 244/54 |
| 2014/0033729 A1 | 2/2014 | Chouard et al. | |
| 2015/0166188 A1 | 6/2015 | Lin et al. | |
| 2018/0186462 A1 | 7/2018 | Brochard | |
| 2019/0009897 A1* | 1/2019 | Baskin | ..................... B64C 27/48 |
| 2019/0352013 A1* | 11/2019 | Whiteford | .............. B64D 27/26 |

FOREIGN PATENT DOCUMENTS

| | | |
|---|---|---|
| EP | 2848535 A1 | 3/2015 |
| FR | 2974065 A1 | 10/2012 |
| FR | 3059982 A1 | 6/2018 |
| GB | 2013786 A | 8/1979 |

OTHER PUBLICATIONS

French Search Report; priority document.

* cited by examiner

*Primary Examiner* — Amy J. Sterling
(74) *Attorney, Agent, or Firm* — Greer, Burns & Crain, Ltd.

(57) ABSTRACT

An assembly for an aircraft comprising a pylon having a mounting plate having a front face and a rear face and through which there passes, between the front face and the rear face, at least one central bore, a front engine mount comprising a spar with a rear face bearing against the mounting plate front face and which, for each central bore, has a complementary central bore aligned with the central bore, and for each central bore, a mounting system. The mounting system comprises a shear pin inserted into the central bore and the complementary central bore from the rear face with a flange bearing against the rear face, a support with a central hole, the diameter of which is greater than the flange diameter and fixed to the rear face, and a cap fixed to the support closing off the central hole and bearing against the shear pin.

5 Claims, 3 Drawing Sheets

US 10,858,114 B2

ASSEMBLY FOR AN AIRCRAFT, THE ASSEMBLY COMPRISING A PYLON AND A FRONT ENGINE MOUNT

CROSS-REFERENCES TO RELATED APPLICATIONS

This application claims the benefit of the French patent application No. 1857073 filed on Jul. 30, 2018, the entire disclosures of which are incorporated herein by way of reference.

FIELD OF THE INVENTION

The present invention relates to an assembly for an aircraft which comprises a pylon and a front engine mount, to a propulsion assembly of an aircraft comprising such an assembly, and to an aircraft comprising at least one such propulsion assembly.

BACKGROUND OF THE INVENTION

An aircraft conventionally comprises a wing under which is mounted a pylon on which an engine is mounted. The engine is fixed to the pylon via a system of mounts made up, among other things, at the front by a front engine mount and at the rear by a rear engine mount.

In instances in which the front engine mount is positioned against a front edge of the pylon, mounting is provided by tension bolts and shear pins are perpendicular to the front edge, namely horizontal overall.

The engine is first of all fixed to the front engine mount and, because of its structure, it impedes access to the front face of the front engine mount.

Positioning the front engine mount against the front edge of the pylon is then performed by hoisting vertically. When the front engine mount is in position, the shear pins and the tension bolts are fitted.

Because of the difficulty in accessing the front face of the front engine mount, it is difficult to fit the shear pins and the tension bolts.

SUMMARY OF THE INVENTION

It is an object of the present invention to propose an assembly for an aircraft which comprises a pylon and a front engine mount which comprises means for making it easier to fit and fix the shear pin.

To this end, the invention proposes an assembly for an aircraft and comprising:
 a pylon having a mounting plate having a front face and a rear face and through which there passes, between the front face and the rear face, at least one central bore,
 a front engine mount comprising a spar which has a rear face bearing against the front face of the mounting plate and which, for each central bore, has a complementary central bore aligned with the central bore, and
 for each central bore, a mounting system which comprises:
  a shear pin which is inserted into the central bore and the corresponding complementary central bore from the rear face of the mounting plate and which has a flange bearing against the rear face of the mounting plate,
  a support with a central hole the diameter of which is greater than the diameter of the flange and fixed to the rear face of the mounting plate so as to align the central hole and the central bore, and
  a cap fixed to the support closing off the central hole and bearing against the shear pin.

Such an assembly system can therefore be fitted on just one side even if the other side is inaccessible.

Advantageously, the mounting plate has passing through it, between the front face and the rear face, at least one peripheral bore, for each peripheral bore, the spar has a complementary peripheral bore aligned with the peripheral bore and a nut fixed in the region of the complementary peripheral bore, and the mounting system comprises, for each peripheral bore, a tension bolt which screws into the nut from the rear face of the mounting plate by passing through the peripheral bore and the complementary peripheral bore.

Advantageously, the head of each tension bolt has a distinctive shape, and the assembly comprises a rotation proofing system which comprises:
 a mounting plate fixed between the rear face of the mounting plate and the support, having an opening aligned with the central bore and the diameter of which is greater than the diameter of the flange of the shear pin and which has a wing pierced with a locking hole,
 a locking plate having a distinctive counter shape, where the distinctive shape and the distinctive counter shape collaborate to lock the locking plate against rotation about the axis of the tension bolt and a locking opening aligned with the locking hole, and
 a pin which fits into the locking opening and the locking hole.

The invention also proposes a propulsion assembly for an aircraft comprising an engine and an assembly according to one of the above alternative forms.

The invention also proposes an aircraft comprising at least one propulsion assembly according to the above alternative form.

BRIEF DESCRIPTION OF THE DRAWINGS

The abovementioned features of the invention, together with others, will become more clearly apparent from reading the following description of one exemplary embodiment, the description being given with reference to the attached drawings, among which.

DETAILED DESCRIPTION OF THE PREFERRED EMBODIMENTS

Figures 1, 2:
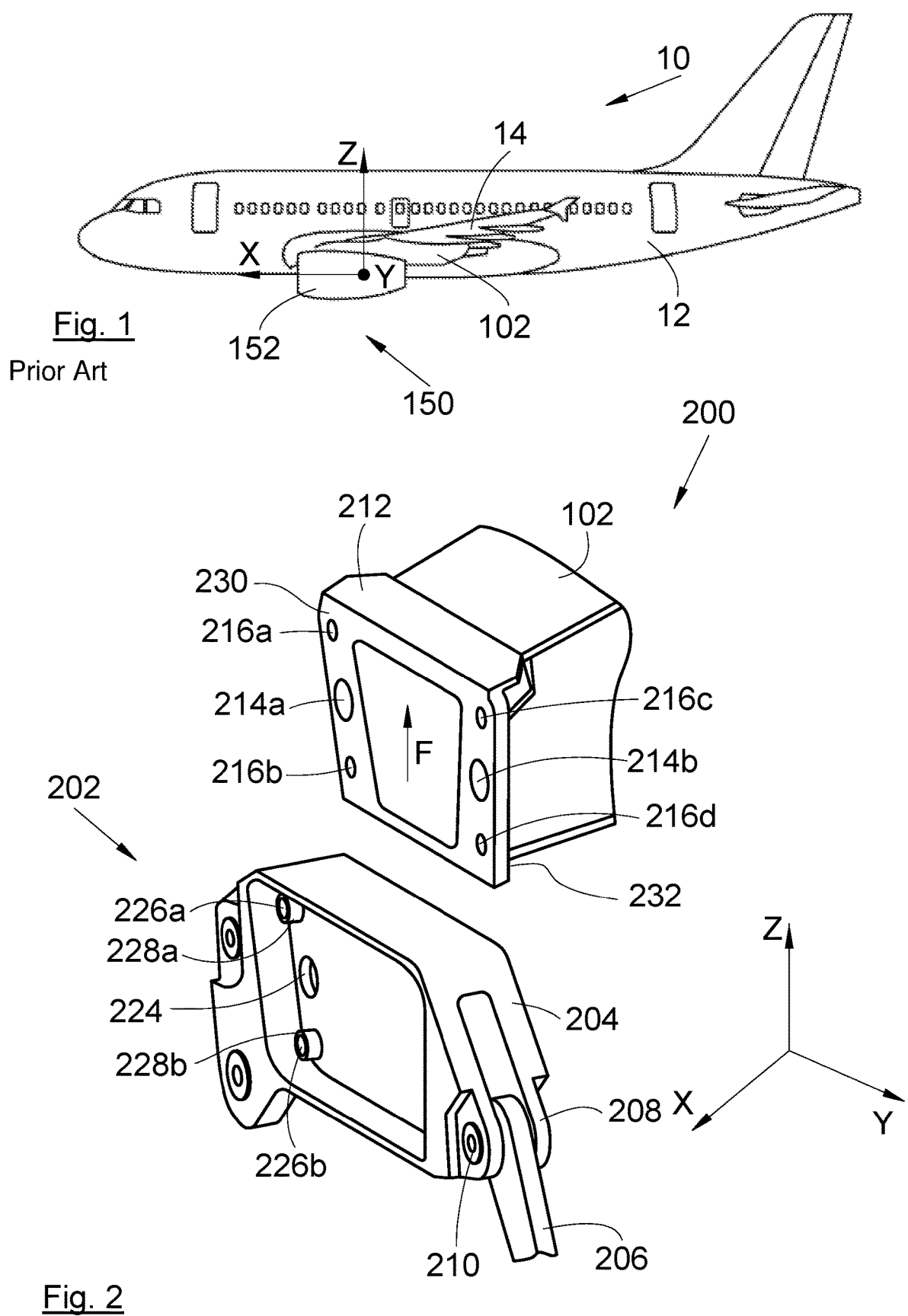
FIG. 1 is a side view of an aircraft having at least one assembly according to the invention.
FIG. 2 is a perspective view of an assembly according to the invention prior to assembly.

In the description which follows, terms relating to a position are considered with reference to an aircraft in the position of normal forward travel, namely as depicted in FIG. 1.

FIG. 1 shows an aircraft 10 which comprises a fuselage 12 having a wing 14 on each side.

Mounted under each wing 14 is a pylon 102 with an engine 150 mounted on the pylon 102. The engine 150 is, for example, a turbojet engine and comprises among other things a structural casing which is fixed to the pylon 102 and a nacelle 152 which constitutes the aerodynamic fairing of the engine 150 and which is fixed both to the structural casing and to the pylon 102.

Throughout the description which will follow, and by convention, the direction X corresponds to the longitudinal direction of the engine 150, this direction being parallel to the longitudinal axis of the engine 150. Furthermore, the direction Y corresponds to the direction oriented transversely with respect to the engine 150, and the direction Z corresponds to the vertical or heightwise direction, these three directions X, Y, Z being mutually orthogonal.

FIG. 2 shows an assembly 200 which comprises the pylon 102 and a front engine mount 202. For reasons of simplicity, the structural casing is not depicted, but it is fixed to the front engine mount 202 and has a part which lies in front of the front engine mount 202 and impedes access thereto.

The front engine mount 202 which is therefore fixed between the pylon 102 and the structural casing comprises a spar 204 fixed to the pylon 102 and two coupling plates 206 (just one can be seen in FIG. 2) positioned one on each side of a mid plane XZ of the engine 150. Each coupling plate 206 is fixed between the spar 204 and the structural casing.

For each coupling plate 206, the spar 204 and the structural casing have a clevis 208 in which one end of the coupling plate 206 is inserted and fixed by the fitting of a mounting system 210 of the screw-nut type.

The front edge of the pylon 102 has a mounting plate 212 which is vertical overall and has a front face 230 facing forwards and a rear face 232 facing rearwards.

The mounting plate 212 has passing through it, between the front face 230 and the rear face 232, at least one central bore 214a-b.

In the embodiment of the invention depicted here, there are two central bores 214a-b. The axis of each central bore 214a-b is horizontal overall and parallel to the longitudinal direction X.

Each central bore 214a-b is intended to accept a shear pin.

For each central bore 214a-b, the spar 204 has a complementary central bore 224 which aligns with the corresponding central bore 214a-b.

The fitting of the spar 204 against the mounting plate 212 is performed by vertical hoisting F until each complementary central bore 224 becomes aligned with the corresponding central bore 214a-b of the mounting plate 212. During fitting, the front face 230 positions itself against a rear face of the spar 204.

Figure 3:
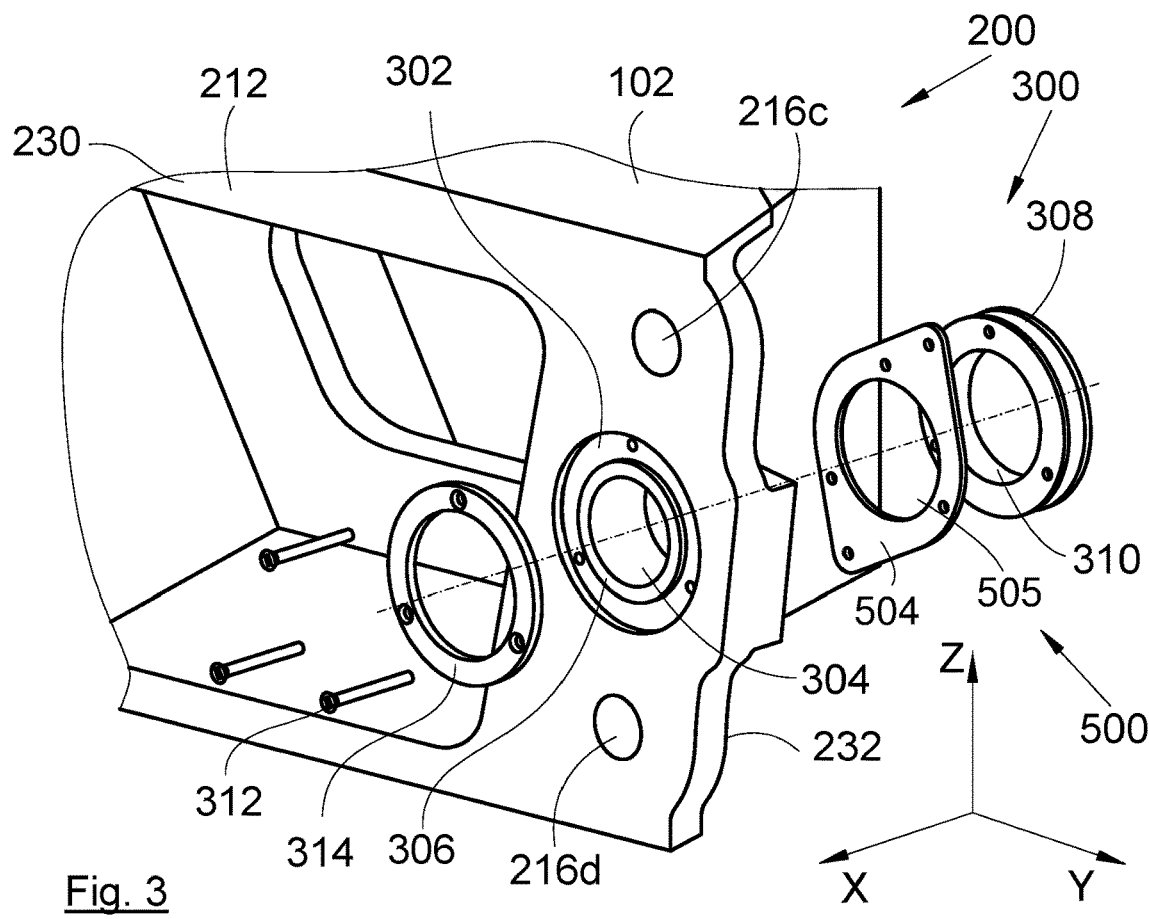
FIG. 3 is a perspective and exploded view of a mounting system according to the invention.
Figure 4:
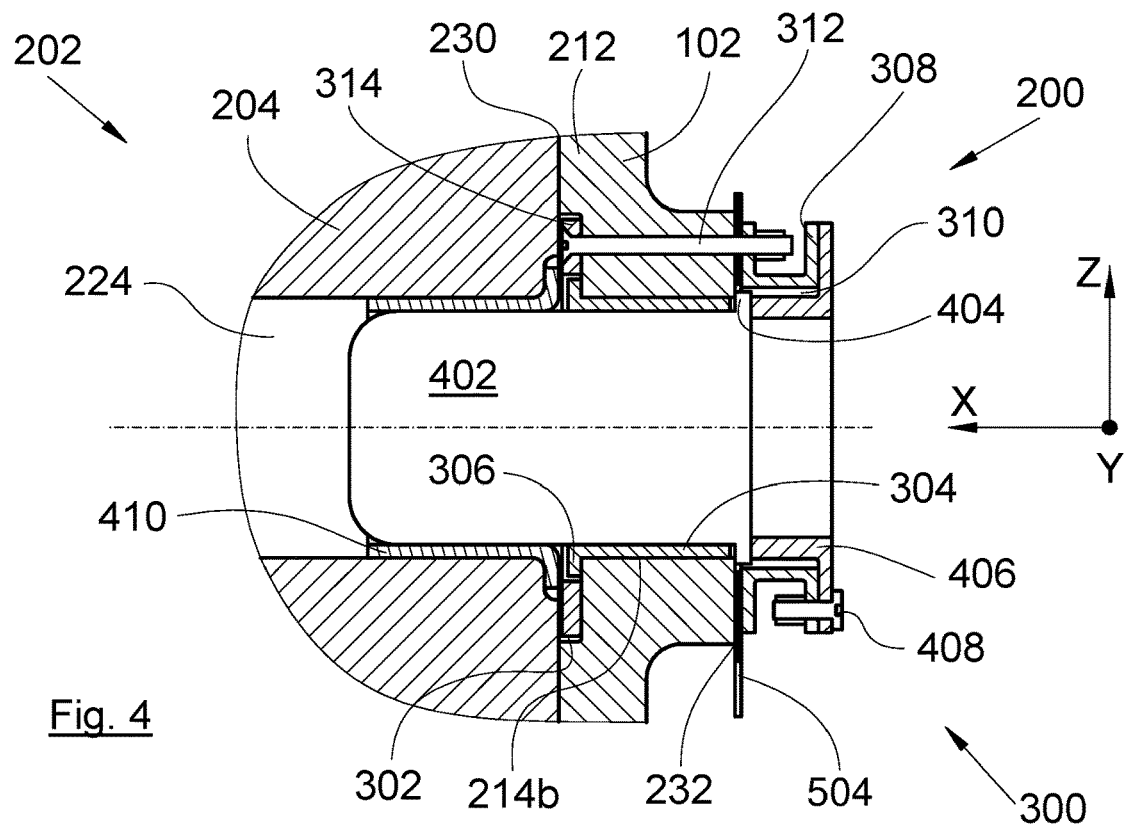
FIG. 4 is a view in cross section of the assembly according to the invention in the assembled position.
Figure 5:
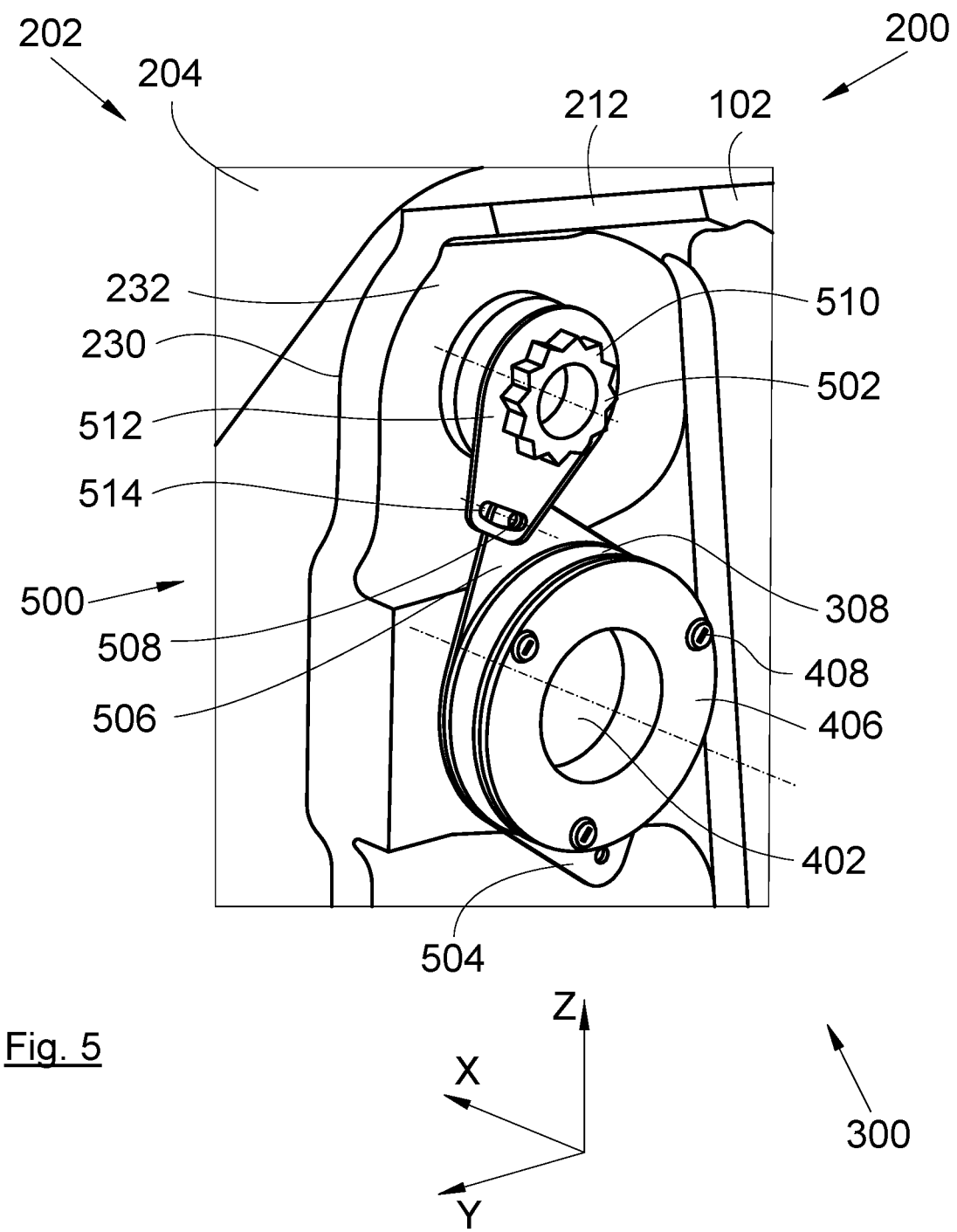
FIG. 5 is a perspective view of the assembly in the assembled position.

FIG. 3 and FIG. 4 show a mounting system 300 which is fitted for each central bore 214a-b.

The mounting system 300 comprises a shear pin 402 which has a flange 404. The shear pin 402 is inserted into the central bore 214a-b and into the corresponding complementary central bore 224 from the rear face 232 of the mounting plate 212 and its flange 404 comes to bear against the rear face 232 of the mounting plate 212. The length of the shear pin 402 is sufficient that the pin lies both in the central bore 214b and in the corresponding complementary central bore 224 of the spar 204.

The mounting system 300 comprises a support 308 with a central hole 310, the diameter of which is greater than the diameter of the flange 404. The support 308 is fixed to the rear face 232 of the mounting plate 212 in such a way as to align the central hole 310 and the central bore 214b. The support 308 is fixed in place, in this instance, by three screws 312 which screw into nuts attached to the support 308 while passing through the mounting plate 212 from the front face 230 to the rear face 232 through drillings made for that purpose. This mode of attachment does not require the drillings to be tapped, but any other mode of attachment is equally possible, for example tapping the drillings and screwing the screws 312 in from the rear face 232.

The mounting system 300 comprises a cap 406 which attaches removably to the support 308 and closes off the central hole 310 and comes to bear against the shear pin 402.

The attachment of the cap 406 is performed here using screws 408 which screw from the rear face 232 into nuts attached to the support 308.

The fitting of the mounting system 300 comprises fixing the support 308 to the rear face 232. Once the spar 204 is facing the mounting plate 212, the shear pin 402 is fitted from the rear face 232, and finally the cap 406 is fixed to the support 308 from the rear face 232.

Thus, after the spar 204 has been positioned, there is no need to have access to the front of the spar 204 for fitting the shear pin 402.

In the invention embodiment set out here, the mounting system 300 comprises an antifriction ring 304 which is housed in the central bore 214b. The shear pin 402 is therefore pushed into the antifriction ring 304.

The mounting plate 212 has, on its front face 230 around the central bore 214b, a recess 302 and, in the invention embodiment depicted here, the antifriction ring 304 has a flange 306 which fits into the recess 302. The antifriction ring 304 is thus, in this instance, fitted from the front face 230.

It is equally possible to make provision for the recess to be situated on the side of the rear face 232 and for the antifriction ring 304 thus to be fitted here from the rear face 232.

In the invention embodiment depicted here, the mounting plate 212 also has four peripheral bores 216a-d. The axis of each peripheral bore 216a-d is horizontal overall and parallel to the longitudinal direction X. The mounting plate 212 here has, on each side of the mid plane XZ, one central bore 214a-b and two peripheral bores 216a-d, in which one peripheral bore 216a, 216c is positioned above the central bore 214a-b and in which one peripheral bore 216b, 216d is positioned below the central bore 214a-b. Of course, the number of central bores 214a-b and of peripheral bores 216a-d may be different.

Each peripheral bore 216a-d is intended to accept a tension bolt 502 and opens onto the front face 230 and the rear face 232.

For each peripheral bore 216a-d, the spar 204 has a complementary peripheral bore 226a-b which aligns with the corresponding peripheral bore 216a-d.

For each peripheral bore 216a-d, the spar 204 comprises a nut 228a-b which is fixed in the region of the corresponding complementary peripheral bore 226a-b so as to allow a tension bolt 502 of the mounting system 300 to be screwed in.

When the spar 204 is fitted against the mounting plate 212, each peripheral bore 216a-d aligns with the corresponding complementary peripheral bore 226a-b.

The tension bolts 502 are also fitted from the rear face 232 of the mounting plate 212 and screw into the nuts 228a-b of the spar 204 which have been provided for this purpose, and by passing through the peripheral bores 216a-d and the complementary peripheral bore 226a-b.

The mounting plate 212 protrudes beyond the body of the pylon 102 at the sides so that the central bores 214a-b and the peripheral bores 216a-d are accessible from the rear face 232.

In the invention embodiment depicted here, the mounting system 300 comprises an additional antifriction ring 410 which is housed in the complementary central bore 224 of the spar 204 which aligns with the central bore 214b of the mounting plate 212. The additional antifriction ring 410 has a flange which fits into a recess that the spar 204 has in its rear face around the complementary central bore 224. The shear pin 402 is therefore pushed into the additional antifriction ring 410.

The mounting system 300 also comprises, for each tension bolt 502, a rotation proofing system 500 which prevents the tension bolt 502 from turning.

The rotation proofing system 500 comprises a mounting plate 504 which is fixed between the rear face 232 of the mounting plate 212 and the support 308. The mounting plate 504 has an opening 505 aligned with the central bore 214b and the diameter of which is greater than the diameter of the flange 404 of the shear pin 402 so as to allow the latter to be fitted from the rear face 232.

In the invention embodiment depicted here, the mounting plate 504 has holes for the passage of screws 312.

For each neighboring tension bolt 502 of the mounting plate 504, this mounting plate has a wing 506 which extends towards the tension bolt 502 and which is pierced with a locking hole 508.

The head of each tension bolt 502 has a distinctive shape 510 and the rotation proofing system 500 comprises a locking plate 512 which has a distinctive counter shape in which the distinctive shape 510 and the distinctive counter shape collaborate with one another to lock the locking plate 512 against rotation about the axis of the tension bolt 502.

In the invention embodiment depicted here, the distinctive shape 510 is a male form in the distinctive shape of a star and the distinctive counter shape is a star-shaped female form.

The locking plate 512 has a locking opening 514, in this instance of oblong shape, which aligns with the locking hole 508.

The rotation proofing system 500 also comprises a pin which is positioned and fitted into the locking opening 514 and the locking hole 508 to prevent the locking plate 512 and, therefore, the tension bolt 502, from turning.

In the invention embodiment depicted in FIGS. 3 and 4, the mounting system 300 also comprises a collar 314 which fits into the bottom of the recess 302 and which comprises countersunk holes to house the heads of the screws 312.

Thus, for the aircraft 10, a propulsion assembly according to the invention comprises the engine 150, the assembly 100 with the pylon 102 and the front engine mount 202.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft comprising:
   a pylon having a mounting plate having a front face and a rear face and through which there passes, between the front face and the rear face, at least one pylon central bore,
   a front engine mount comprising a spar which has a rear face bearing against the front face of the mounting plate and which, for each pylon central bore, has a complementary spar central bore aligned with the pylon central bore, and
   for each pylon central bore, a mounting system which comprises:
      a shear pin inserted into the pylon central bore and the corresponding complementary spar central bore from the rear face of the mounting plate and which has a flange bearing against the rear face of the mounting plate,
      a support with a central hole, a diameter of which is greater than a diameter of the flange, and fixed to the rear face of the mounting plate to align the central hole and the pylon central bore, and
      a cap fixed to the support, closing off the central hole, and bearing against the shear pin.

2. The assembly according to claim 1, wherein the mounting plate has passing therethrough, between the front face and the rear face, a peripheral bore, wherein, for the mounting plate peripheral bore, the spar has a complementary spar peripheral bore aligned with the mounting plate peripheral bore and a nut fixed in a region of the complementary peripheral bore, and wherein the mounting system comprises, for the peripheral bore, a tension bolt which screws into the nut from the rear face of the mounting plate by passing through the mounting plate peripheral bore and the complementary spar peripheral bore.

3. The assembly according to claim 2, wherein a head of the tension bolt has a distinctive shape, and wherein the assembly comprises a rotation proofing system which comprises:
   a second mounting plate fixed between the rear face of the mounting plate and the support, having an opening aligned with the pylon central bore and a diameter of which is greater than the diameter of the flange of the shear pin and which has a wing pierced with a locking hole,
   a locking plate having a distinctive counter shape, where the distinctive shape of the tension bolt head and the distinctive counter shape of the locking plate collaborate to lock the locking plate against rotation about the axis of the tension bolt and a locking opening aligned with the locking hole, and
   a pin which fits into the locking opening and the locking hole.

4. A propulsion assembly for an aircraft comprising:
an engine, and
an assembly for the aircraft comprising:
   a pylon having a mounting plate having a front face and a rear face and through which there passes, between the front face and the rear face, at least one pylon central bore,
   a front engine mount comprising a spar which has a rear face bearing against the front face of the mounting plate and which, for each pylon central bore, has a complementary spar central bore aligned with the pylon central bore, and for each pylon central bore, a mounting system which comprises:
- a shear pin inserted into the pylon central bore and the corresponding complementary spar central bore from the rear face of the mounting plate and which has a flange bearing against the rear face of the mounting plate,
- a support with a central hole, a diameter of which is greater than a diameter of the flange, and fixed to the rear face of the mounting plate to align the central hole and the pylon central bore, and
- a cap fixed to the support, closing off the central hole, and bearing against the shear pin.

5. An aircraft comprising:
a propulsion assembly for the aircraft comprising:
  an engine, and
  an assembly for the aircraft comprising:
    a pylon having a mounting plate having a front face and a rear face and through which there passes, between the front face and the rear face, at least one pylon central bore,
    a front engine mount comprising a spar which has a rear face bearing against the front face of the mounting plate and which, for each pylon central bore, has a complementary spar central bore aligned with the pylon central bore, and
    for each pylon central bore, a mounting system which comprises:
      a shear pin inserted into the pylon central bore and the corresponding complementary spar central bore from the rear face of the mounting plate and which has a flange bearing against the rear face of the mounting plate,
      a support with a central hole, a diameter of which is greater than a diameter of the flange, and fixed to the rear face of the mounting plate to align the central hole and the pylon central bore, and
      a cap fixed to the support, closing off the central hole, and bearing against the shear pin.

* * * * *